United States Patent [19]

Rollins

[11] 4,074,664
[45] Feb. 21, 1978

[54] FUEL CONTROL SYSTEM FOR INTERNAL COMBUSTION ENGINES

[75] Inventor: Ralph T. Rollins, Holladay, Utah

[73] Assignee: Astron Innovations, Inc., Salt Lake City, Utah

[21] Appl. No.: 657,352

[22] Filed: Feb. 12, 1976

[51] Int. Cl.$^2$ ............................................. F02M 31/10
[52] U.S. Cl. .............................. 123/75 B; 123/32 ST; 123/41.31; 123/191 S; 123/122 A; 123/122 AA; 261/144
[58] Field of Search ............... 123/32 J, 32 ST, 32 SJ, 123/32 SP, 41.31, 41.32, 191 S, 191 SP, 122 A, 122 AA, 122 AB, 75 B; 165/165, 51; 261/144, 145

[56] References Cited

U.S. PATENT DOCUMENTS

| Re. 6,107 | 10/1874 | Ponsard | 165/165 |
|---|---|---|---|
| 1,181,122 | 5/1916 | Eastman | 123/32 SJ X |
| 1,392,364 | 10/1921 | Smith | 123/32 ST |
| 1,539,133 | 5/1926 | Markle et al. | 123/41.32 |
| 1,790,854 | 2/1931 | Defrance et al. | 123/141 |
| 2,257,047 | 9/1941 | Finestone | 123/122 A X |
| 3,066,662 | 12/1962 | May et al. | 123/32 ST X |
| 3,765,384 | 10/1973 | Barnard | 123/41.32 |
| 3,809,039 | 5/1974 | Alquist | 123/32 ST X |
| 3,832,985 | 9/1974 | Edde | 123/122 AA X |

FOREIGN PATENT DOCUMENTS

| 102,574 | 12/1937 | Australia | 261/145 |
|---|---|---|---|
| 314,325 | 12/1929 | United Kingdom | 123/32 SP |

Primary Examiner—Alan Cohan
Assistant Examiner—Gerald A. Michalsky
Attorney, Agent, or Firm—B. Deon Criddle

[57] ABSTRACT

A fuel control system for internal combustion engines including a stratified charge igniter, a secondary carburetor regulating fuel flow to the igniter and common cooling means for the igniter and pre-heating means for the fuel. The pre-heating means includes both heating grids that are geometrically arranged to contact and vaporize fuel supplied to the igniter from the secondary carburetor and heated fuel distribution apparatus.

5 Claims, 7 Drawing Figures

FUEL CONTROL SYSTEM FOR INTERNAL COMBUSTION ENGINES

BRIEF DESCRIPTION OF THE INVENTION

1. Field of the Invention

This invention relates to internal combustion engines and more particularly to systems for providing combustible fuel to such engines and for firing the fuel provided.

2. Prior Art

It has long been recognized that existing internal combustion engines are not as efficient as is desired. It is acknowledged that they use far more fuel than they should and that the exhausts they discharge are damaging to the environment.

It has also long been recognized that if the fuel mixture fed into the combustion chamber can be totally burned during a combustion cycle, maximum efficiency is obtained and polluting exhaust emissions are eliminated.

Because there are so many internal combustion engines presently in use throughout the world and because the costs required to change current engine designs are so high, it is desirable to have apparatus that can be readily adapted for conventional internal combustion engines to make them more efficient. Others have proposed the use of such apparatus in the past, but so far as I am aware none have achieved wide success.

U.S. Pat. No. 1,959,541, for example, shows apparatus to be applied to existing internal combustion engines, wherein a segregated small portion of the engine fuel charge is ignited and the flame thus created is used to ignite the remainder of the charge. The auxiliary combustion chamber, or igniter, is arranged for insertion in the usual spark plug opening of the engine. The segregated small portion of the fuel charge is forced into the combustion chamber during the compression cycle of the piston of the engine and the exterior of the combustion cyclinder is provided with fins to dissipate the heat created during the firing of the segregated fuel charge.

In U.S. Pat. No. 2,121,920, separate carburetors are used to supply the same or different fuels to a primary firing chamber and a combustion cylinder of an internal combustion engine. Fuel ignited in the primary firing chamber is used for idling of the engine or for providing a flame that will ignite the fuel charge in the combustion cylinder.

U.S. Pat. No. 2,700,963, discloses a fuel injection device, including a housing to be screwed into the usual spark plug opening of an internal combustion engine, and into which a spark plug can be screwed to ignite a fuel and compressed air mix injected into the housing.

U.S. Pat. Nos. 3,066,661 and 3,066,662, show ignition devices for internal combustion engines including housings with auxiliary chambers therein, into which spark plugs are screwed. Adapters on the housing screw into the usual spark plug apertures in a cylinder head of an engine. As disclosed, a pilot fuel charge supplied by one carburetor is ignited in each auxiliary combustion chamber and the burning torch-like jet thus created ignites a relatively lean fuel mix supplied to the associated main combustion chamber of the engine. Valves are provided between the fuel inlets to the housings shown in the patents and the auxiliary combustion chambers. The exterior of the housing disclosed in U.S. Pat. No. 3,066,662, has a plurality of axially spaced radially outwardly extending fins thereon for the radiation and conduction of excess heat away from the combustion chamber.

U.S. Pat. No. 3,154,058, shows a device that is similar to those shown in U.S. Pat. Nos. 3,066,661 and 3,066,662, but that includes an inlet pressure responsive control valve and an inlet spray nozzle through which fuel is supplied to an auxiliary combustion chamber. Another such device is shown by U.S. Pat. No. 3,404,667, but in this device a mouthpiece of Borda configuration is provided on the auxiliary combustion chamber end of a nozzle that interconnects the auxiliary combustion chamber and the main combustion chamber of the engine. Still another similar device, incorporating means to protect the inlet valve from heat, is shown in U.S. Pat. No. 3,479,997.

While the aforementioned patents generally recognize the value of preigniting a charge of rich fuel in an auxiliary combustion chamber and then using the burning rich fuel to ignite a lean fuel mix introduced into the main combustion chamber of an internal combustion engine, and recognize that such an arrangement will produce better fuel economies and a reduction of emission pollutants, the devices shown by the patents have not been utilized commercially to any great degree. The prior art patents also recognize the advantages in having such devices arranged and constructed so that they can be utilized with existing internal combustion engines presently in commercial use, as well as being adapted to be factory installed on new engines without requiring extensive redesign of tooling, etc. used in the manufacture of such engines. Even with such knowledge it does not appear that others, in the past, have been able to commercially utilize the patented devices. This may have been because the devices have not been economically feasible to construct in such a manner that they can withstand the pressures generated at the ignition temperatures reached during ignition of the rich fuel mix in the auxiliary combustion chambers or it may have been that they could never achieve the sought after desired economies and exhaust pollutant reductions under all conditions of operation and particularly when used in cold weather.

SUMMARY OF THE INVENTION

Principal objects of the present invention are to provide a fuel control system for internal combustion engines that can be readily adapted to existing engines, that will have long life and that will significantly reduce the fuel consumption of the engine and the exhaust pollutants discharged therefrom.

Other objects are to provide such a fuel control system wherein an auxiliary combustion chamber is liquid cooled and the fuel supplied to the auxiliary combustion chamber is pre-heated to insure efficient and complete burning thereof upon ignition.

Still other objects are to provide such a fuel control system that is easily installed; that will operate efficiently under varied use conditions; that will result in a maximum instantaneous combustion of fuel in the main combustion chamber of the engine.

Principal features of the invention include at least one stratified charge fuel igniter having an auxiliary combustion chamber, a spark plug, a fuel inlet and a water jacket surrounding the auxiliary combustion chamber. The outlet of the stratified charge fuel igniter forms a nozzle that effectively distributes flame from the auxiliary combustion chamber throughout a maximum main combustion chamber area. A secondary carburetor regulates fuel flow to the auxiliary combustion chamber and the liquid used to cool the stratified charge fuel igniter is also used to pre-heat the fuel.

Other features include a water jacketed distribution line through which fuel is distributed to one or more of the stratified fuel igniters and a water heated grid system in which fuel-air mixtures are vaporized, thereby further increasing the efficiency of the system.

Additional objects and features will become apparent to those skilled in the art from the following detailed description, taken together with the accompanying drawings showing a preferred embodiment of the invention.

THE DRAWINGS

In the drawings:

FIG. 1 is a perspective, fragmentary view of an automobile engine incorporating the fuel control system of the present invention;

FIG. 2, an enlarged transverse section through the distribution line, taken on the line 7—7 of FIG. 1;

FIG. 3, an enlarged vertical section through a stratified charge igniter of the system, taken on the line 3—3 of FIG. 1;

FIG. 4, a similar view, taken on the line 4—4 of FIG. 1;

FIG. 5, a vertical section through the fuel pre-heater of the system, taken on the line 5—5 of FIG. 1;

FIG. 6, a similar view, but showing a transverse section, on the line 6—6 of FIG. 1; and FIG. 7, an exploded view of the fuel pre-heater and with the housing component partially broken away and with the gaskets and seals omitted for clarity.

DETAILED DESCRIPTION

Figure 1:
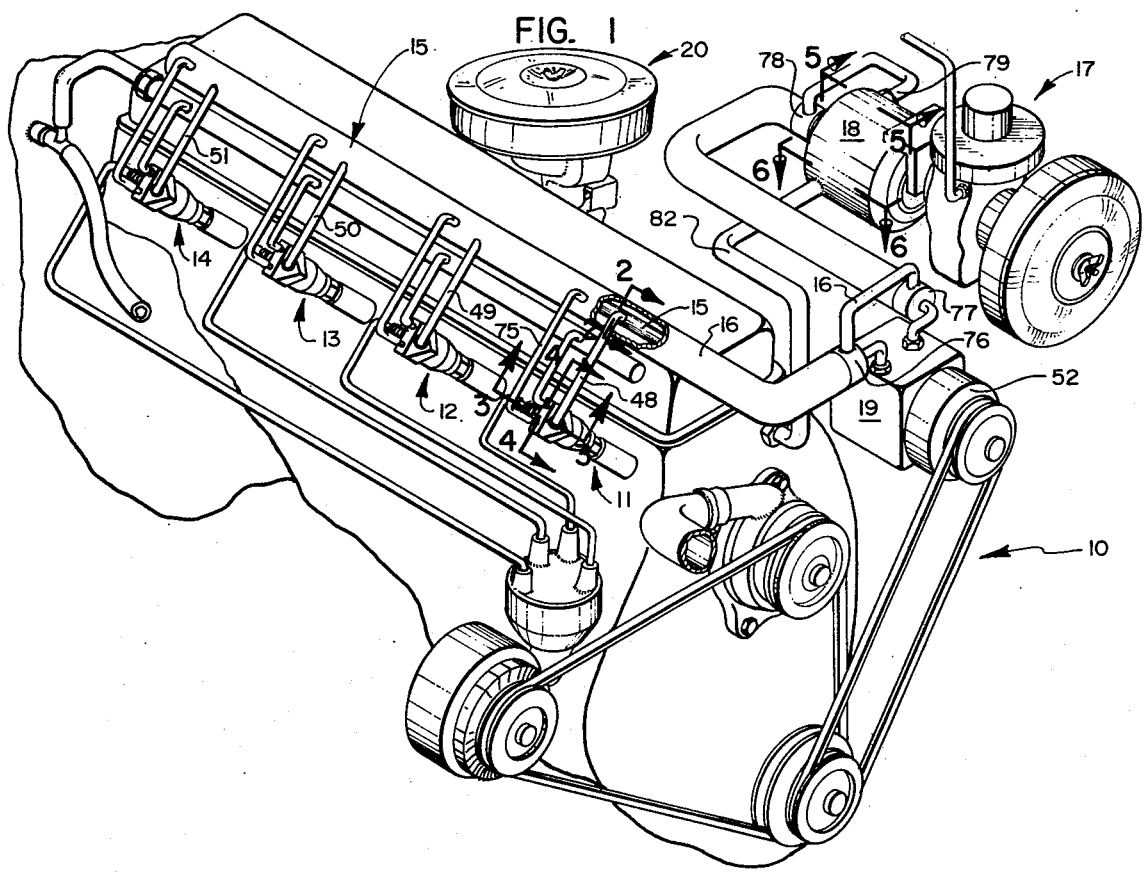
Figure 2:
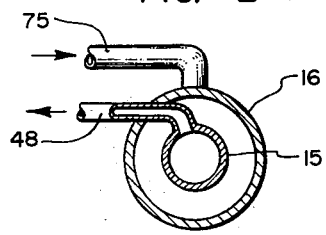

Referring now to the drawings:

In the embodiment illustrated, the fuel control system of the invention is mounted on a four cylinder automobile engine, shown generally at 10. The system, includes stratified charge fuel igniters 11, 12, 13, and 14, a distribution line shown generally at 15, through which fuel-air mix is distributed to the stratified charge fuel igniters and having a surrounding line 16 through which heated liquid is passed. A secondary carburetor 17 supplies the fuel-air mix to the stratified charge fuel igniters. An in-line pre-heater 18 is provided, and a booster pump 19 may be provided, in the line 15.

As will be hereinafter described in greater detail, gasoline is supplied to both the secondary carburetor 17 and the usual main carburetor 20 for the engine, from a fuel pump, not shown, with about five percent of the total gasoline supplied going to the secondary carburetor. The gasoline delivered to the main carburetor 20 is then used in customary fashion to supply an air-fuel mix to the main combustion chambers of the engine 10. The mix supplied to the main combustion chambers of the engine is extremely lean, i.e. in the order of twenty-five pounds of air to one pound of gasoline and, in the absence of the fuel control system of the invention, would not be rich enough to provide combustion and engine operation.

The gasoline supplied to the secondary carburetor is mixed with air by the carburetor and this air-fuel mix, which is in the order of fifteen pounds of air to one pound of gasoline, is discharged from the carburetor through line 15 to pre-heater 18. If the booster pump 19 is provided it will, when necessary, help to move the air-fuel mix from the pre-heater, through the line 15, and into the stratified charge igniters 11–14.

While not shown, it will be apparent that the main and secondary carburetors can be linked together and demand operated in conventional fashion.

Figure 4:
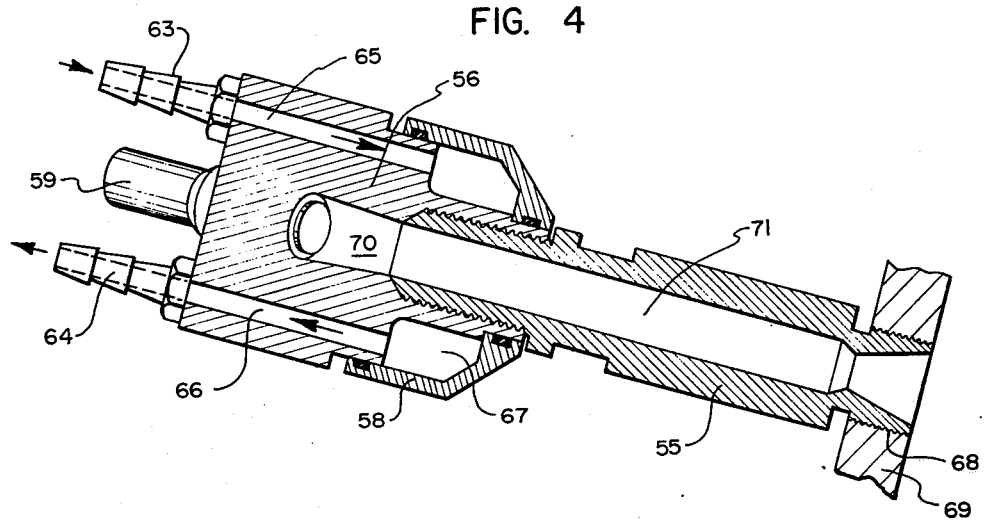
Figure 5:
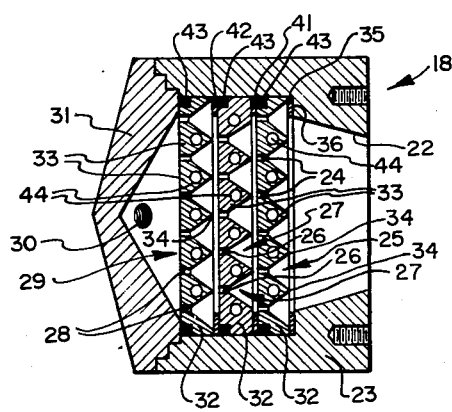
Figure 6:
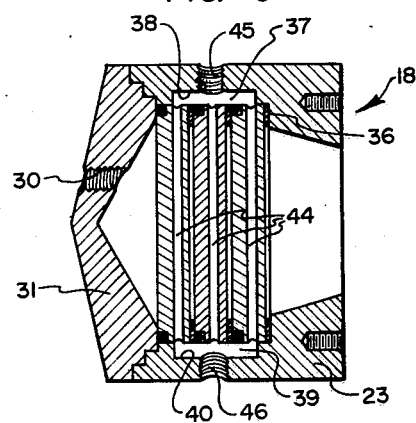
Figure 7:
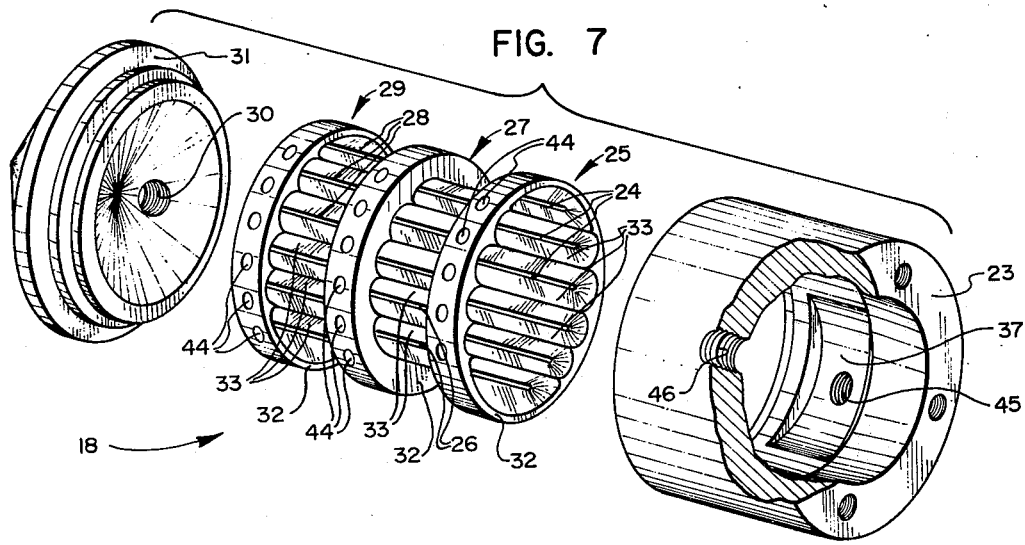

The air-fuel mix discharged from the secondary carburetor enters the in-line pre-heater 18 through a large port 22, FIGS. 4 and 5, in a housing 23 of the pre-heater. The air-fuel mix then passes through slots 24 of a baffle 25, slots 26 of a baffle 27, slots 28 of a baffle 29 and out of the pre-heater and into line 15 through a port 30 in an end cap 31 that closes one end of the housing 23.

Each baffle 25, 27 and 29 has a ring-shaped peripheral wall 32 and the equally spaced slots of each baffle extend parallel to one another as cords of the interior of the ring-shaped baffle wall. Partitions 33 extend across the interior of each of the ring-shaped baffle's walls, to separate and define the slots and to provide heat circulating means, as will be further described. Baffle 27 has one less slot and one less partition than does each of the baffles 25 and 29.

Each partition 33 is shaped to have a central knife-like edge 34 and each of the slot dividing partitions 33 of the baffles 25 and 29 and all of the partitions of baffle 27 have holes 44 extending longitudinally therethrough and through opposite sides of the peripheral wall 32.

When the pre-heater 18 is assembled a ring-shaped gasket 35 is positioned against a shoulder 36 in the housing 23 and the baffle 25 is placed with its periphery wall against the gasket and with the holes at one end of the partitions thereof opening into the space 37 provided by a notch 38 at one side of housing 23 and with the other ends of the partition holes opening into a space 39 provided by a notch 40 at an opposite side of the housing 23. Ring-shaped spacers 41 and 42, respectively separate and seal between the baffles 25 and 27 and 27 and 29, and an O-ring seal 43 is fitted into a groove provided therefore around the peripheral wall of each baffle to prevent leakage between the peripheral wall 32 and the housing 23.

The baffle 27 has one less groove and one less partition than does either of the other baffles 25 and 29 and when the baffles are sandwiched together, as described, and are held tightly together by the end cap 31, the knife-like edges of the partitions of baffle 27 are aligned with the slots 24 of baffle 25 and the knife-like edges of the partitions of baffle 29 are aligned with the slots 26 of baffle 27. Thus, fuel entering the pre-heater 18 through port 22, is directed by the partitions 33 of baffle 25 through the adjacent slots 24 where it will impact against and be directed by the partitions 33 of baffle 27 through the slots 26 of the baffle. The fuel then impacts against and is directed by the partitions 33 of baffle 29 through the slots 28 of baffle 29 and then out the port 30 to the line 15. As the air-fuel mix is moved through the pre-heater 18 it will also be heated by hot liquid that enters the space 37 through a port 45 in the sidewall of housing. The hot liquid passes through the holes 44 into space 39 and then through another port 46 and through the sidewall of the housing to a line 47, FIG. 1, that returns it to the cooling system of engine 10.

As the air-fuel mix from secondary carburetor 17 is passed through the pre-heater 18 the fuel particles are broken down and are vaporized. The air-fuel mix is then moved in line 15 to a location adjacent to the stratified charge igniters 11-14 where it is distributed through lines 48, 49, 50 and 51 respectively, to the stratified charge igniters 11, 12, 13 and 14.

With some smaller engines, it may be necessary to utilize the booster pump 19, powered by the fan shaft of the engine, to move the air-fuel mix from the pre-heater 18, through the line 15 to lines 48-51. It has been found that the booster pump is not necessary in all cases and, when used, the pump may include an electromagnetic clutch 52 that will engage the pump to the fan shaft only when insufficient pressure is otherwise available to insure proper flow of the air-fuel mix through line 15.

Figure 3:
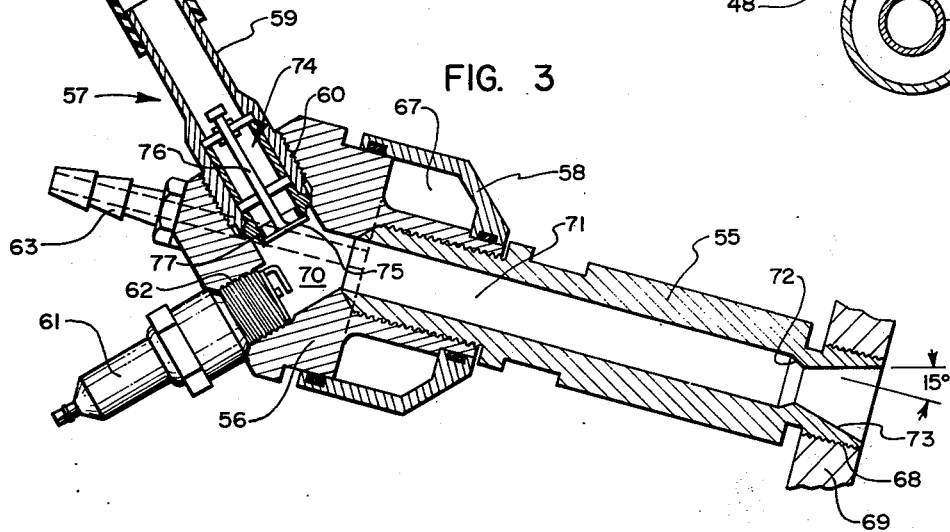

The stratified charge igniters 11-14 are identically constructed and operated, as shown at 11 in FIGS. 3 and 4. As illustrated, each igniter includes an elongate lower housing 55, an upper housing 56 threaded onto the lower housing at 57, a water jacket 58 and a fuel line adapter 59 that is threaded into the upper housing at 60. A conventional spark plug 61, or the like, is threaded into the upper housing at 62 and a pair of coolant connectors 63 and 64 are connected to ports 65 and 66, respectively, that open into opposite sides of a space 67 formed around the upper housing 56 by the water jacket 58.

The lower housing 55 has threads 68 thereon to allow the igniter to be screwed into the threaded spark plug opening of the cylinder head 69 of engine 10.

A chamber 70 is provided in the upper housing 56 and the threaded bores into which the fuel line adapter 59 and spark plug 61 are screwed open angularly into one end of the chamber. A bore 71 in the lower housing also opens into and forms a smooth extension of the chamber 70. The bore 71 has a restriction 72 formed therein near the end thereof remote from chamber 70 and is flared outwardly from the restriction to the end of the bore at 15° angle to form a nozzle 73 that will effectively distribute burning fuel to a maximum area of the main combustion chamber of engine 10 into which bore 71 opens. When the burning fuel passes through bore 71, as will be hereinafter described in greater detail, it has been found that if the nozzle is flared at an angle greater than about 15½° the discharging flame swirls or rolls and does not give effective coverage in the main combustion chamber and that if it is flared less than about 14½° the flame is discharged in a straight pattern and again fails to give proper flame distribution for most efficient operation. For optimum operation, it has been found that the cross-sectional area of the outlet end of nozzle 73 should be five times that of the inlet end thereof.

A valve 74, including a valve head 75 and a stem 76 is mounted in the fuel line adapter such that the head will set against a valve seat 77 that is press fitted into the inserted end of the fuel line adapter 59. Valve 74 is pressure responsive, opening to allow fuel from the line 48 to enter the chamber 70 during the intake cycle of the main combustion chamber into which the injector 11 is threaded and closing during the compression cycle and firing to thereby prevent combustion in the line 15.

The small relatively rich air-fuel mix supplied from the secondary carburetor 16, through the pre-heater 17, line 15 and line 11 is stratified in the chamber 70 and is ignited by the spark plug 61 and instantly forms a torch-like flame in the chamber 70 and the aligned bore 71 in the lower housing 55. The flame velocity is increased somewhat by the restriction 72 and the flame is widely distributed through nozzle 73 to the main combustion chamber of the engine to instantaneously ignite the larger, relatively lean, air-fuel mix fed into the main combustion chamber through main carburetor 20 in conventional fashion.

The water jacket 58 is sealed against an enlarged upper portion of upper body 56 and a smaller cut-away portion such that the space 67 extends fully around the upper end portion of bore 71 near its junction with chamber 70. Coolant connector 63 is connected to a source of coolant liquid, under pressure and, when the system of the present invention is used with an automobile engine, as shown, may be connected to the usual heater hose of the vehicle. So arranged, the coolant of the automobile engine will be circulated through connector 63, the space 67 and out connector 64. A line 75 connects connector 64 with the line 16 surrounding fuel line 15 and through line 16 to pre-heater 18. Through fittings 76 and 77, the line 16 by-passes the booster pump 19 and a fitting 78 connects the line 16 to a fitting 79 of port 45 through the wall of housing 23. Port 45 opens into the space 37 provided by notch 38 and the coolant passed through line 16 enters the space 37 and then passes through the holes 44 in the baffles to the space 39 provided by notch 40. The port 46 is connected into space 39 provided by notch 40 and the coolant passes through port 46 and a line 82 connected thereto to the cooling system of engine 10.

It will be apparent that upon starting of engine 10 a portion of the engine coolant will immediately be circulated through the water jacket 58. The coolant will be heated and will carry away heat generated during firing of the small, relatively rich air-fuel charge in the injector 11. The heated coolant is then passed through line 16, which forms a jacket for line 15, thereby heating the air-gas mix in the line 15. The air-gas mix is further heated as it is passed through the baffles 25, 27 and 29, which baffles are heated by the heated liquid from line 16 passed therethrough.

It has been found that in the absence of the described liquid cooling system for the injector 11 the extreme heat and pressures developed results in fracturing of the upper portions of the injector housings and failure of the system. Also, most efficient operation of the system was not obtained until the relatively rich air-fuel mix from the secondary carburetor was vaporized in the pre-heater 18 and was heated prior to introduction into chamber 70.

The lower portion of the lower body portion 55 is sufficiently cooled by conduction, through the usual water cooled head of internal combustion engine 10, that an additional water jacket is not required.

Although a preferred form of my invention has been herein disclosed, it is to be understood that the present disclosure is by way of example and that variations are possible, without departing from the scope of the hereinafter claimed subject matter, which subject matter I regard as my invention.

I claim:

1. A fuel control system for internal combustion engines comprising
a stratified charge igniter having a housing with one end adapted to be screwed into the spark plug opening of an internal combustion engine, a bore through the housing, a secondary combustion chamber in the bore at the other end of the housing, a spark plug opening through the housing and opening into the secondary combustion chamber, a spark plug in the spark plug opening;
a fuel line adapter having a passage therethrough extending through the housing into the secondary combustion chamber, and a pressure responsive valve in the fuel line adapter, said valve allowing flow into the secondary combustion chamber but preventing flow therefrom through the fuel line adapter;

means including a water jacket for circulating liquid around at least part of the housing to cool the housing;

a secondary carburetor;

a fuel line interconnecting said secondary carburetor and the fuel line adapter, whereby an air-fuel mix is supplied to the secondary combustion chamber from the secondary carburetor through the fuel line;

means to heat the air-fuel mix said means comprising a line surrounding the fuel line,
   conduit means interconnecting the interior of the water jacket with the interior of said line surrounding the fuel line,
   a pre-heater unit in the fuel line, said pre-heater unit including heated baffle means through which the air-fuel mix is passed, and means coupling the interior of the water jacket to the pre-heating means, whereby liquid cooling the igniter is used to heat the baffle means.

2. A fuel control system for internal combustion engines as in claim 1, wherein
   the pre-heater unit includes a housing having an inlet and an outlet for heated liquid and an inlet and an outlet for air-fuel mix, a plurality of the baffle means arranged in said housing, slots through each of said baffle means and partitions at opposite sides of the slots, said slots and partitions in adjacent baffle means being staggered and arranged between the inlet and outlet for the air-fuel mix, at least some of said partitions having holes therethrough through which liquid supplied to the interior of the housing is passed.

3. A fuel control system for internal combustion engines as in claim 2, further including
   means coupling the interior of the pre-heater unit to the interior of the water jacket, whereby coolant heated in the water jacket will circulate through the holes in the partitions of the baffle means to heat an air-fuel mix passed through the slots in the baffle means.

4. A fuel control system for internal combustion engines as in claim 3, wherein the means coupling the interior of the pre-heater unit to the interior of the water jacket comprises
   a line that surrounds the fuel line, whereby liquid heated in the water jacket heats an air-fuel mix in the fuel line and the pre-heater unit.

5. A fuel control system for internal combustion engines as in claim 4, further including
   a booster pump in the fuel line, said booster pump being operable to increase the pressure in the fuel line upon the occurance of demand conditions in the engine.

* * * * *